Patented Sept. 10, 1940

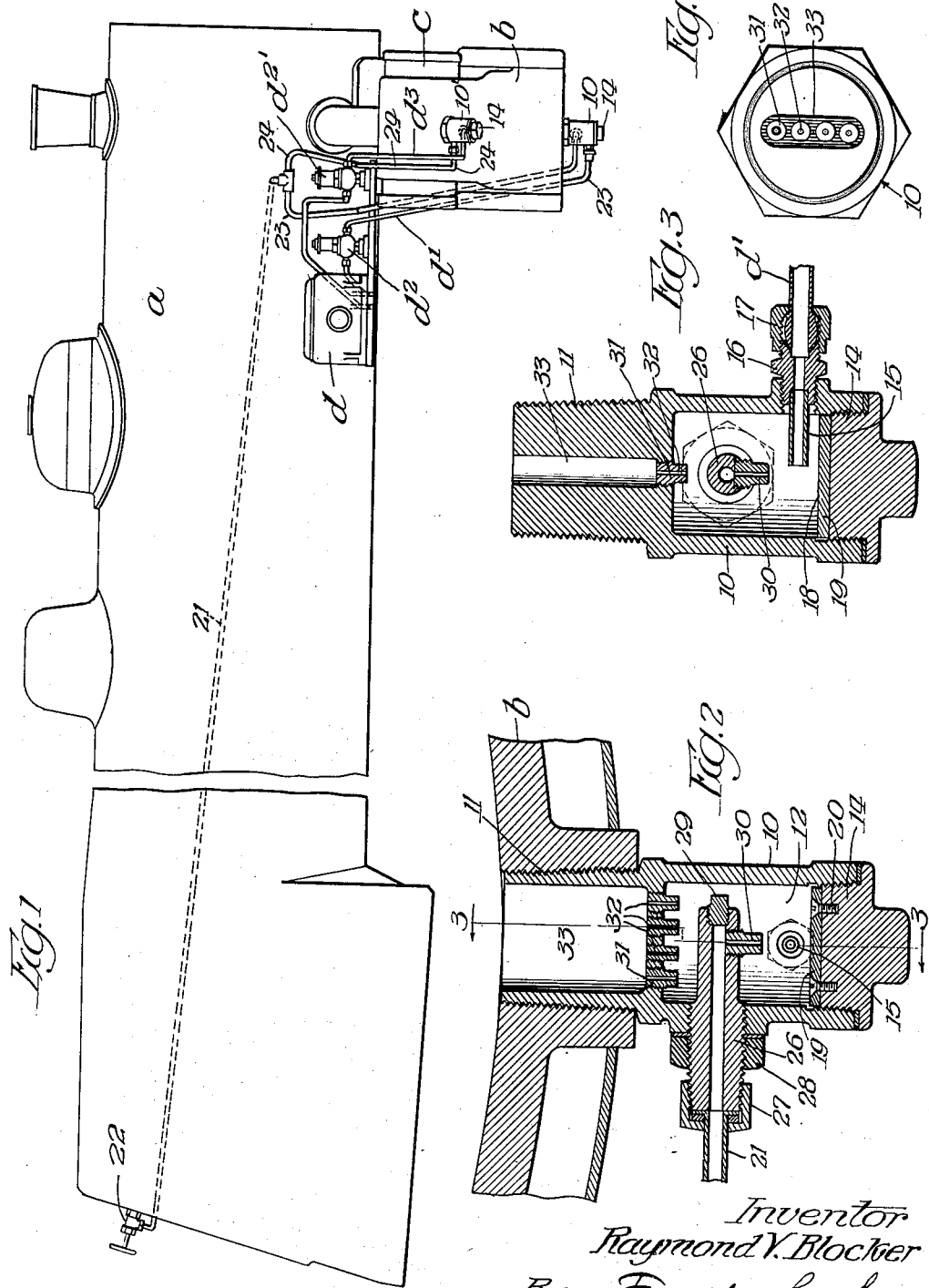

2,214,242

UNITED STATES PATENT OFFICE 2,214,242

LUBRICATING APPARATUS

Raymond V. Blocker, Huntington, Ind., assignor to T-Z Railway Equipment Company, Chicago, Ill., a corporation of Illinois Application August 13, 1938, Serial No. 224,679

11 Claims. (Cl. 184—56)

The invention relates to lubricating apparatus of the type which is more particularly adapted for lubricating chambers such as the valve-chambers and cylinders of steam-engines used on locomotives and in which it is desired to cause the lubricant to be distributed throughout the chambers for lubricating the surfaces of the parts therein, such as the valves and pistons, respectively.

One object of the invention is to provide improved lubricating means whereby the lubricant is vaporized by the action of a fluid under pressure, such as steam, and delivered into the chamber to be lubricated as a homogeneous vapor wherein the oil is suspended without impairing its structure or lubricating properties, so it will be assimilated throughout the chamber and lubricate all of the working or mechanical parts therein. In practice it has been found that when the oil is delivered into the cylinder or valve-chamber without previous vaporization, it will not be distributed over all of the surfaces requiring lubrication. The invention contemplates providing a chamber in which the lubricant is vaporized by the action of the steam before it is delivered into the chamber to attain the uniform distribution of the lubricant throughout the chamber and efficient lubrication of the working parts therein.

Another object of the invention is to provide a lubricating apparatus of this type which can be readily applied as an attachment to railroad locomotives of standard types.

Another object of the invention is to provide lubricating apparatus of this type which is simple in construction, can be readily applied to a locomotive, and in which the parts subjected to wear can be readily replaced.

Other objects of the invention will appear from the detailed description.

The invention consists in the several novel features which are hereinafter set forth and are more particularly defined by claims at the conclusion hereof.

In the drawing: Fig. 1 is a side elevation of a railroad-locomotive equipped with lubricating apparatus embodying the invention for the valve-chambers and cylinder of the engine. Fig. 2 is an axial section through the vaporizing-device. Fig. 3 is a section on line 3—3 of Fig. 2. Fig. 4 is a plan of the vaporizing-device.

The invention is exemplified as applied to a locomotive $a$ equipped with a steam-engine comprising a cylinder $b$ and a valve-chest $c$ containing the valve for controlling the steam to the cylinder, all of which may be of usual or any suitable construction or type.

The lubricating apparatus comprises a suitable force-feed lubricator $d$ delivering oil in measured quantity and which, through a pipe $d^1$ in which a check-valve $d^2$ is included, is adapted to force the lubricant to the vaporizing-device for delivering lubricant into the cylinder $b$ and a pipe $d^3$, in which a check-valve $d^{2\prime}$ is included, for delivering lubricant to the vaporizing-device for lubricant to the valve-chamber in valve-chest $c$. The construction of the vaporizing-devices for the cylinder and for the valve-chamber are identical in construction so that a description of one is applicable to both.

Each vaporizing-device comprises a casing 10 which is provided with a screw-threaded nipple 11 which is adapted to be screwed into the engine-wall around the chamber to be lubricated. A vaporizing-chamber 12 is formed in casing 10 and the outer end of the casing is closed by a screw-plug or cap 14 to permit its removal for access to said chamber. The pipe $d^1$ delivers lubricant to a short pipe-section 15 which is fixed in a nipple or coupling member 16 which is screw-threaded into one side of the casing 10 adjacent its lower or outer end and is detachably connected by a union 17 to member 16. The inner end of pipe-section 15 terminates adjacent the center of the chamber 12 and delivers the lubricant onto a baffle-surface 18, in the lower end of the chamber 12. This baffle-surface is formed on a disc 19 of hard or wear-metal which is removably secured by screws 20 to the inner face of cap 14 so that when the baffle-surface becomes worn, the disc can be readily replaced upon removal of the cap. Steam, under boiler pressure or pressure equal to the pressure of steam delivered to the engine, is supplied to the vaporizing-chamber from a pipe 21 and the delivery of steam to the lubricating devices under control of suitable means, such as a valve 22 in the engineer's cab. A branch-pipe 23 delivers steam from pipe 21 to the vaporizing-device for the cylinder $b$ and a second branch-pipe 24 delivers steam to the vaporizing chamber of the device for lubricating the chamber in valve-chest $c$. Each of the steam-delivery pipes 23, 24 is detachably connected to one of the casings 10 by a nipple 26 and a union-coupling 27. Each nipple 26 is screw-threaded into casing 10 and is locked thereto by a nut 28. The inner end of nipple 26 is closed by a screw-plug 29. A nozzle 30 is threaded into the lower side of nipple 26 and is provided with an orifice for delivering a jet of steam against the baffle-surface 18 adjacent its center and at the point where the lubricating-oil is discharged from the pipe-section 15.

When the lubricating apparatus is in operation, the jet of steam from nozzle 30 impacted against the baffle-surface 18 vaporizes the lubricant in the chamber 12. A series of nozzles 31 having jet orifices 32 which extend axially therethrough are screw-threaded into the wall of casing 10 at the upper or inner end of vaporizing-chamber 12. A narrow duct 33 extends from said upper wall to the inner end of nipple 11 to direct the jets of vaporized lubricant and steam from the vaporizing-chamber 12 directly into the cylinder or valve-chamber to be lubricated.

In the operation of the lubricating apparatus, the force-feed lubricator $d$, suitably operated by power, will discharge lubricant in measured quantities through pipes $d^1$, $d^3$ to the baffle-surfaces 18 in the ends of casings 10 and 10' of the lubricating-devices for the engine-cylinder and valve-chamber. In each of these devices the lubricant will be discharged onto the central portion of the baffle-surface 18. A jet of steam from pipe 21, under boiler pressure and control of the valve 22, will be discharged through each nozzle 30 against its associated baffle-surface 18 onto which the oil is delivered and will mix with and vaporize the oil in chambers 12 and produce a homogeneous vapor in which the oil is suspended without impairing its structure for lubrication. This vapor will pass through the jet openings 32 in a series of fine streams and be discharged through narrow duct 33 directly into the chambers to be lubricated. The operation of the lubricating-device may be continued while the engine is drifting to produce lubrication at that time.

The invention exemplifies lubricating apparatus for chambers in which the lubricant is vaporized before it is discharged into the steam-chamber for lubricating the parts therein which, in practice, has been found to result in creating a homogeneous vapor wherein the oil is suspended without impairing its structure and its lubricating properties and in the distribution of the lubricant to all portions of the chambers for efficient and uniform lubrication of all of the parts. This has been found to overcome the deficiencies and lack of uniformity in delivering the lubricant into the chambers without vaporization before delivering the lubricant into said chambers.

The invention also exemplifies simple lubricating apparatus which is adapted to be readily installed and applied as an attachment to locomotives of standard construction.

It also exemplifies a lubricating apparatus of that type which is simple in construction and readily accessible for repair and replacement of parts which are subjected to wear.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In lubricating apparatus for engines, the combination of a casing having a portion adapted to extend through, and provided with means for removably securing it to, the engine-casing, and provided with a mixing-chamber, a cap for closing one end of the mixing-chamber, a baffle removably secured to the cap, a pipe extending into the casing for delivering lubricant onto the baffle, a nozzle in the casing for delivering steam under pressure onto the baffle for vaporizing the lubricant, and a duct in the casing for delivering mixed steam and vaporized lubricant from the mixing-chamber into the engine.

2. In lubricating apparatus for engines, the combination of a casing having a portion adapted to extend through, and provided with means for removably securing it to the engine-casing, and provided with a mixing-chamber, a baffle in and at one end of the mixing-chamber, means comprising a pipe-section removably secured in the casing for delivering lubricant onto the baffle, a nozzle removably secured in the casing for delivering steam under pressure onto the baffle for vaporizing the lubricant, and a duct in the end of the casing opposite the end at which the baffle is disposed for delivering mixed steam and vaporized lubricant from the mixing-chamber into the engine.

3. In lubricating apparatus for engines, the combination of a casing having a portion adapted to extend through and provided with means for removably securing it to the engine-casing, and provided with a mixing-chamber, a removable cap for closing one end of the mixing-chamber, a baffle in the mixing-chamber and on the cap, a pipe terminating in the mixing-chamber for delivering lubricant onto the baffle, means, comprising a nipple removably secured in the casing and a nozzle in said nipple, for delivering steam under pressure onto the baffle for vaporizing the lubricant, and means in the casing for delivering mixed steam and vaporized lubricant from the mixing-chamber into the engine.

4. In lubricating apparatus for engines, the combination of a casing having a portion adapted to extend through and provided with means for removably securing it to the engine-casing, and provided with a mixing-chamber, a baffle in the mixing-chamber, a pipe extending into the casing for delivering lubricant onto the baffle, a nozzle in the casing for delivering steam under pressure onto the baffle for vaporizing the lubricant, a row of nozzles, and a narrow elongated duct in the casing for delivering mixed steam and vaporized lubricant from the row of nozzles into the engine.

5. In lubricating apparatus for engines, the combination of a casing provided with a mixing chamber, a baffle extending transversely across said chamber, means for delivering lubricant onto the baffle, a nozzle for delivering a jet of steam under pressure against the baffle, the baffle being adapted to reverse the flow of steam from the nozzle, and means for delivering the reversely flowing vaporized lubricant and steam to the engine.

6. In lubricating apparatus for engines, the combination of a casing provided with a mixing chamber, a baffle extending transversely across said chamber, a pipe extended to the central portion of the casing, a nozzle for delivering a jet of steam against the baffle and across the outlet end of the pipe, the baffle being adapted to reverse the flow of the vapor and lubricant, and means for delivering the reversely flowing vaporized lubricant and steam to the engine.

7. In lubricating apparatus for engines, the combination of a casing provided with a mixing chamber, a baffle extending across one end of said chamber, means for delivering lubricant to the baffle, a nozzle for delivering a jet of steam directly against the baffle and disposed intermediate the ends of the mixing chamber, and means at the opposite end of the chamber for delivering the vaporized lubricant and steam to the engine.

8. In lubricating apparatus for engines, the combination of a casing provided with a mixing chamber, a baffle extending across one end of said chamber, a pipe for delivering lubricant to the baffle and extending to the central portion of the chamber, a nozzle for delivering a jet of steam directly against the baffle and across the lubricant delivered by the pipe and disposed intermediate the ends of the mixing chamber, and means at the opposite ends of the chamber for delivering the vaporized lubricant and steam to the engine.

9. In lubricating apparatus for engines, the combination of a casing provided with a cylindrical mixing chamber, a baffle extending completely across one end of said chamber, a pipe for delivering lubricant onto the baffle, a nozzle for delivering a jet of steam longitudinally of the cylinder and against the baffle and disposed intermediate the ends of the mixing chamber, and means in the casing at the opposite end of the chamber for delivering the vaporized lubricant and steam to the engine.

10. In lubricating apparatus for engines, the combination of a casing provided with a cylindrical mixing chamber, a baffle extending completely across one end of said chamber, a pipe for delivering lubricant to the central portion of the baffle, a nozzle for delivering a jet of steam directly across the inner end of said pipe and against the baffle and disposed intermediate the ends and at the transverse center of the mixing chamber, and means in the casing at the opposite end of said chamber for delivering the vaporized lubricant and steam to the engine.

11. In lubricating apparatus for engines, the combination of a casing provided with a mixing chamber, a baffle extending across one end of said chamber, means for delivering lubricant onto the baffle, a nozzle for delivering a jet of steam against the baffle, a plurality of discharge nozzles for the vaporized lubricant and steam at the opposite end of said chamber, and a delivery chamber in the casing into which the nozzles discharge for delivering the vaporized lubricant and steam to the engine.

RAYMOND V. BLOCKER.